United States Patent
Mononen et al.

(10) Patent No.: US 10,574,634 B2
(45) Date of Patent: Feb. 25, 2020

(54) MANAGEMENT OF AUTHENTICATOR INFORMATION IN A COMPUTER SYSTEM

(71) Applicant: SSH Communications Security OYJ, Helsinki (FI)

(72) Inventors: Tero Mononen, Helsinki (FI); Markku Rossi, Helsinki (FI); Marko Teiste, Helsinki (FI)

(73) Assignee: SSH Communications Security OYJ, Helsinki (FI)

( * ) Notice: Subject to any disclaimer, the term of this patent is extended or adjusted under 35 U.S.C. 154(b) by 79 days.

(21) Appl. No.: 15/429,526

(22) Filed: Feb. 10, 2017

(65) Prior Publication Data
US 2018/0234400 A1    Aug. 16, 2018

(51) Int. Cl.
| | |
|---|---|
| *H04L 29/06* | (2006.01) |
| *H04L 9/08* | (2006.01) |
| *H04W 12/04* | (2009.01) |
| *G06F 16/901* | (2019.01) |
| *H04L 29/12* | (2006.01) |

(52) U.S. Cl.
CPC .......... *H04L 63/06* (2013.01); *G06F 16/9017* (2019.01); *H04L 9/083* (2013.01); *H04L 63/08* (2013.01); *H04L 63/10* (2013.01); *H04W 12/04* (2013.01); *H04L 61/1523* (2013.01); *H04L 63/04* (2013.01)

(58) Field of Classification Search
CPC ......... H04L 63/06; H04L 63/10; H04L 63/08; H04L 63/04; H04L 61/1523; H04L 9/083; G06F 17/30952; H04W 12/04
See application file for complete search history.

(56) References Cited

U.S. PATENT DOCUMENTS

| | | | |
|---|---|---|---|
| 8,015,594 B2 | 9/2011 | Salowey et al. | |
| 8,214,844 B2 | 7/2012 | Grover | |
| 8,397,083 B1* | 3/2013 | Sussland | H04L 67/1097 380/277 |
| 8,539,562 B2 | 9/2013 | Bolik et al. | |
| 2006/0059332 A1* | 3/2006 | Adams | H04L 63/04 713/156 |
| 2014/0317409 A1* | 10/2014 | Bartok | H04L 63/06 713/171 |
| 2015/0086009 A1* | 3/2015 | Harjula | H04L 9/0894 380/44 |

(Continued)

FOREIGN PATENT DOCUMENTS

WO    2013009621 A1    1/2013

OTHER PUBLICATIONS

Mar. 20, 2018—(EP) Extended Search Report—App 18155562.4-1218.

(Continued)

*Primary Examiner* — Nelson S. Giddins
(74) *Attorney, Agent, or Firm* — Banner & Witcoff, Ltd.

(57) ABSTRACT

The disclosure relates to apparatuses and methods for managing authenticator information in a computerized system. An access request to a host comprising an authenticator is processed to cause searching in an authenticator management host for information corresponding to the authenticator and searching in a directory internal to the host for information corresponding to the authenticator. Modification of information corresponding to the authenticator can then be provided based on the searching.

25 Claims, 7 Drawing Sheets

(56) References Cited

U.S. PATENT DOCUMENTS

| | | | |
|---|---|---|---|
| 2015/0086020 A1* | 3/2015 | Harjula | H04L 9/30 |
| | | | 380/279 |
| 2015/0222604 A1* | 8/2015 | Ylonen | H04L 63/062 |
| | | | 713/171 |
| 2016/0183087 A1* | 6/2016 | Lehtinen | H04L 63/0281 |
| | | | 726/3 |
| 2018/0150646 A1* | 5/2018 | Roth | G06F 21/6218 |

OTHER PUBLICATIONS

Napier, James A., "Secure Automation: Achieving Least Privilege with SSH, Sudo and Setuid," 2004 LISA XVIII, Nov. 14-19, 2014, Atlanta, Georgia, retrieved Feb. 9, 2019 from https://www.usenix.org/legacy/event/lisa04/tech/full_papers/napier/napier.pdf, 10 pages.

Thorpe, Christopher, "SSU Extending SSH for Secure Root Administration," Proceeding of the Twelfth Systems Administration Conference (LISA '98), Dec. 6-11, 1998, Boston, Massachusetts, retrieved Feb. 9, 2019 from http://static.usenix.org/event/lisa98/full_papers/thorpe/thorpe.pdf, 11 pages.

Aug. 16, 2019 (EP) European Office Action—Application No. 18155562.4-1218.

Benjamin Ertl et al., "Identity Harmonization for Federated HPC, Grid and Cloud Services," 2016 International Conference on High Performance Computing & Simulation (HPCS), IEEE, Jul. 18, 2016, pp. 621-627, XP032960595 (retrieved on Sep. 14, 2016).

* cited by examiner

MANAGEMENT OF AUTHENTICATOR INFORMATION IN A COMPUTER SYSTEM

FIELD OF THE INVENTION

This disclosure relates to management of authenticator information in a computer system.

BACKGROUND

Large computing environments can comprise a plurality of entities such as computer devices, user accounts and users. A network host is a computer or other device connected to a computer network. A network host may offer information resources, services, and applications to users or other nodes on the network. A host may be a physical computing device or a virtual computing device (a virtual machine) or a container such as a Linux™ container or equivalent within a physical computing device. Each host may comprise or be associated with one or more user accounts, processes, and/or files. Hosts, user accounts, and other entities in the environment may be associated with groups, e.g., user groups.

Various arrangements for accessing hosts in computing environment by users can be configured. Example of these include web-based access, security protocol (e.g. secure shell protocol; SSH) based access, file transfer access, remote procedure call access, and/or software upgrade access. Such access may be used by, e.g., end users, automation, and/or by system administrators.

Gaining access to a particular entity such as a hosts or a set of hosts can be provided based on authenticators, for example keys or certificates. Different access solutions may include different ways of handling the authenticators, e.g. be based on use of local files or directories and/or central files, e.g., Active Directories, LDAP (Lightweight Directory Access Protocol) directories, NIS (Network Information System) directories), databases and so on. Thus information about authenticators may be in different locations where is has been configured and/or stored differently. Overall awareness of authenticators that may available in the system, and their implications may not be complete and can be difficult to achieve. For example, there can be old keys such as authorized public keys, stored locally in hosts that should no longer be in use. This can be problematic from the point of view of management of accesses to hosts in a network system. This can be particularly so in large network systems and organizations.

SUMMARY

According to an aspect there is provided a method of managing authenticator information in a computerized system, the method comprising: receiving an access request to a host comprising an authenticator, causing searching in an authenticator management host for information corresponding to the authenticator, causing searching in a directory internal to the host for information corresponding to the authenticator, and causing modification of information corresponding to the authenticator based on the searching.

According to another aspect there is provided apparatus for managing authenticator information in a computerized system, the apparatus comprising at least one one processor and at least one memory comprising program code for causing, with the at least one processor, the apparatus to: analyze an access request to a host comprising an authenticator, cause searching in an authenticator management host for information corresponding to the authenticator, cause searching in a directory internal to the host for information corresponding to the authenticator, and cause modification of information corresponding to the authenticator based on the searching.

According to yet another aspect there is provided a non-transitory computer readable media comprising program code for causing a processor to perform instructions for authenticator management operations in a computerized network, the method performed comprising: analyzing an access request to a host comprising an authenticator, causing searching in an authenticator management host for information corresponding to the authenticator, causing searching in a directory internal to the host for information corresponding to the authenticator, and causing modification of information corresponding to the authenticator based on the searching.

According to a more specific aspect there is provided a method and arrangement for granting access in response to finding information corresponding to the authenticator. A host may grant or reject requested access in response to information corresponding to the authenticator being found or not being found.

Information can be communicated from the host to the authentication management host in response to information corresponding to the authenticator being found from the directory internal to the host. Control instructions may be communicated from the authentication management host to the host in response to the host sending information to the authentication management host. The arrangement may grant or reject access to the host based on the control instructions by the authentication management host. Information corresponding to the authenticator in the directory internal to the host can be modified based on information provided by the authentication management host.

The modifying may comprise deleting information corresponding to the authenticator in the directory internal to the host. The modifying may comprise synchronizing the information corresponding to the authenticator between the directory internal to the host and the authentication management host. The modifying may comprise moving information corresponding to the authenticator from the directory internal to the host to the authentication management host.

Searching the authentication management host may be performed before searching the directory internal to the host. Searching in the directory internal to the host may also be performed before searching the authentication management host. According to yet another possibility searching in the authentication management host is performed in parallel to searching the directory internal to the host.

The operation may be implement in the host, in an interim node between the host and a client sending the request for access to the host, or in the authentication management host. The authenticator management host may comprise a key manager or a Lightweight Directory Access Protocol (LDAP) server.

According to a specific aspect the host searches from an authenticator management host for information corresponding to the authenticator and receives information corresponding to the authenticator from the authenticator management host. The host also searches a directory internal to the host for information corresponding to the authenticator. Depending on the results, the host can then cause modification of information corresponding to the authenticator in the directory internal to the host and/or the authentication management host. This can be provided based on information received from the authentication management host. The host may receive modification instructions from the authentication management host directing modification of information corresponding to the authenticator in the directory internal to the host.

Further aspects are disclosed in the detailed description below and the appended dependent claims.

DETAILED DESCRIPTION

In the following certain examples relating to aspects of managing authenticator information in a computerized system are described with reference to the appended drawings. A computerized system can be understood as a network comprising data processing entities such as computers and/or virtual machines, containers, user accounts, directories and/or groups of computers, and other associated components, together with associated software. A physical computer is typically a data processing unit comprising at least one processor, at least one memory and an operating system. A virtual machines (VM) provide functionality of a physical computer by emulating a computer system. A virtual machine is not necessarily provided by a given physical entity but can be provided in what is known as the "cloud". VM implementations may involve specialized hardware, software, or a combination. Each virtual machine runs a unique operating system. A specific software application runs between the hardware and the operating system for creating and running the VMs. A more recent development is operating system level virtualization. The operating system level virtualization allows resources of a computer to be partitioned via the kernel's support for multiple isolated user space instances. Such virtual instances sharing operating system resources are called containers. A characteristic of containers is that they are fast to start ("open") for the task or application. Containers sit on top of a physical server and its host operating system. Containers can thus be described as simplified virtual machines, a difference being that containers do not have their own operating system. Containers may nevertheless look and feel like real machines to the end users. An advantage of containers is that they are computationally light and quick to start. Pods are groups of containers created or destroyed together, usually belonging to the same logical application.

Figure 1:
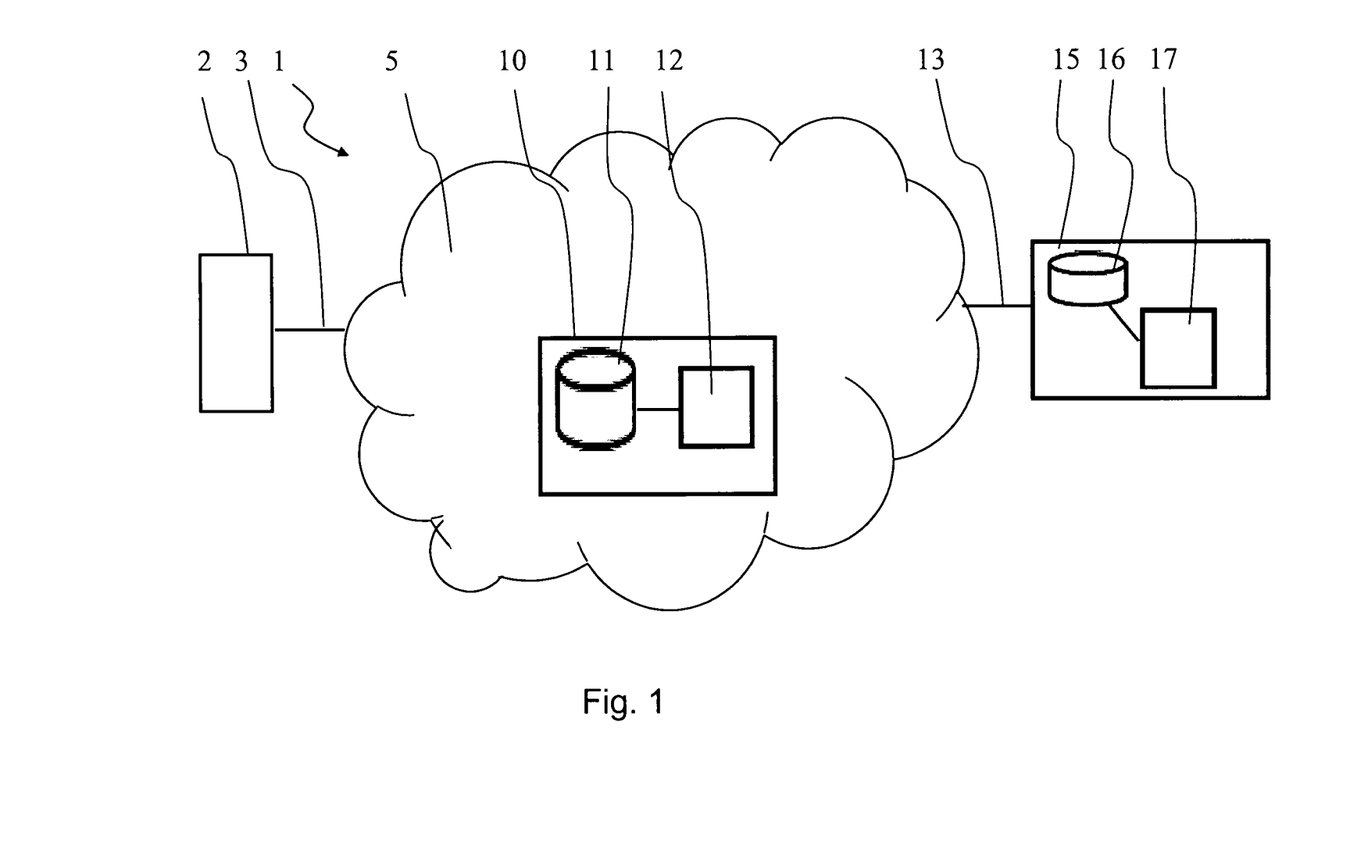
FIG. 1 show an example of a system where the invention may be embodied.

FIG. 1 shows a device 2 or a "user" connected to a network system 5 via connection 3. This can be a wireless or wired connection. A user can be a human and/or a machine, or a group of users. Information for a particular user can be stored in a database, for example in a user account. A user account can define an identity and action or actions the defined identity is authorized to perform. For example, a user account can be configured to define that a user can access a host. A user account can typically be accessed by a given entity or entities. The accessing entity can be a human or a machine. Location of the user account can depend on the type thereof.

Information of users, user accounts, and authenticators such as keys or certificates and so for enabling users to access hosts can be stored locally in the hosts. Instead of conventional local user accounts access related information, in the context of this invention information about authenticators, can also be stored in centrally. Figure shows an authenticator management host 10 that has been provided in the network system 5 for such purpose. An authenticator management host may comprise e.g. a key manager or a Lightweight Directory Access Protocol (LDAP) server.

An authenticator management host 10 can be a network node providing a separate authenticator management entity. The authentication management host 10 can comprise at least one one processor 12 and at least one memory 11 comprising program code for causing, with the at least one processor, the apparatus to process actions for managing authenticators. In case of the authenticators comprise keys, for example public and private key pairs or other symmetric or asymmetric key pairs, the management entity can be provided by a key manager server arranged for centralized management of keys. For example, a Universal Key Manager UKM® server by the assignee may be modified to implement operation described below. A key manager can be arranged to generate, distribute and manage keys for devices and applications of a data network system. For example, a key manager can create keys and provide each host in the system with necessary key information.

FIG. 1 shows also a host 15 connected to the networked system 5 via link 13. The host can be configured to operate according to the principles described below. In accordance with an embodiment an apparatus for managing authenticator information in a computerized system is provided in the host 15 receiving a request for access from the client 2. The apparatus can comprise at least one one processor 17 and at least one memory 16 comprising program code for causing, with the at least one processor, the apparatus to process the access request for analysis of determining an authenticator in the request. The access request comprises an authenticator, and the processor is configured to cause searching in the authenticator management host 10 for information corresponding to the authenticator. The processor 17 is further configured to cause searching in a directory internal to the host for information corresponding to the authenticator, the directory being stored in the memory 16. The processor can then cause modification of information corresponding to the authenticator based on the searching. The modification may take place at the hosts 15 and/or the authenticator management host 10.

Figure 2:
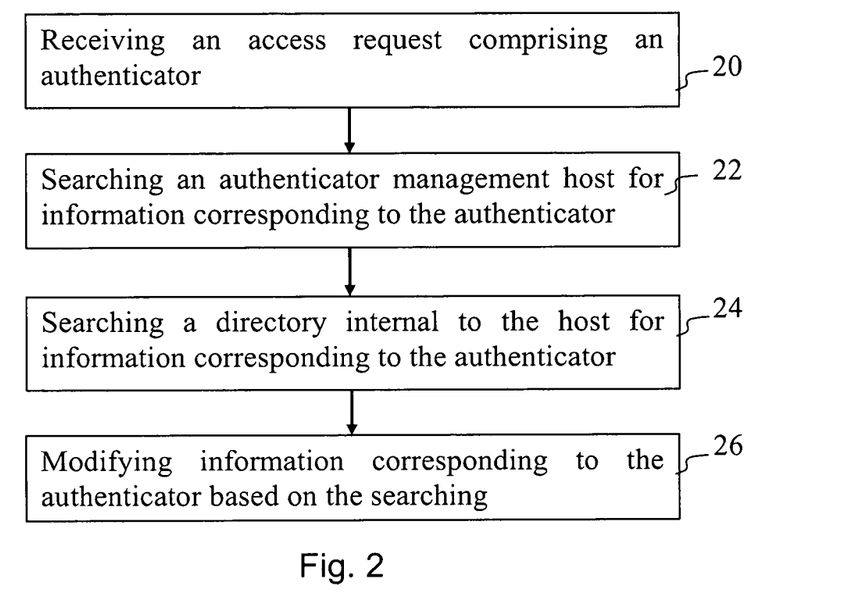
FIGS. 2, 3, 4, 5, 6 and 7 show flowcharts according to some examples.
Figure 3:
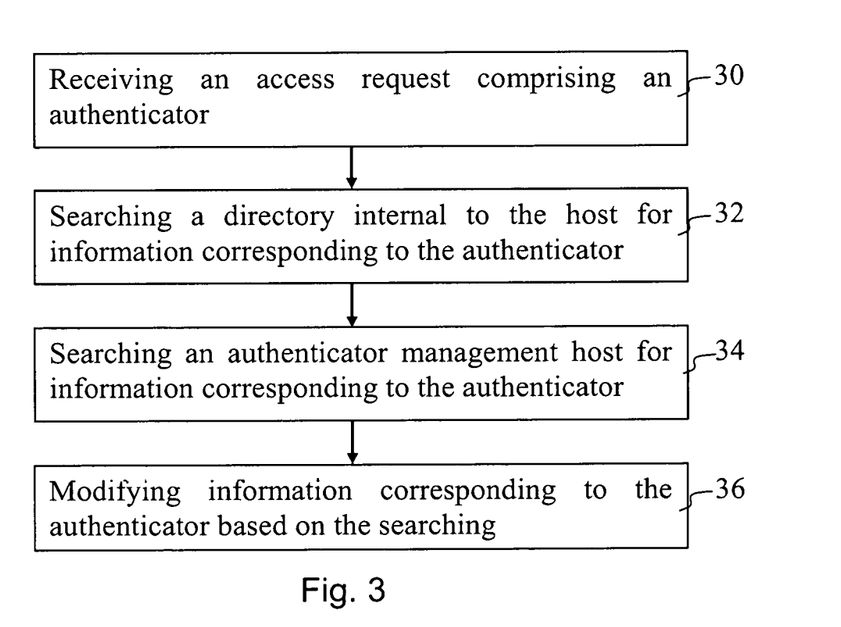
Figure 4:
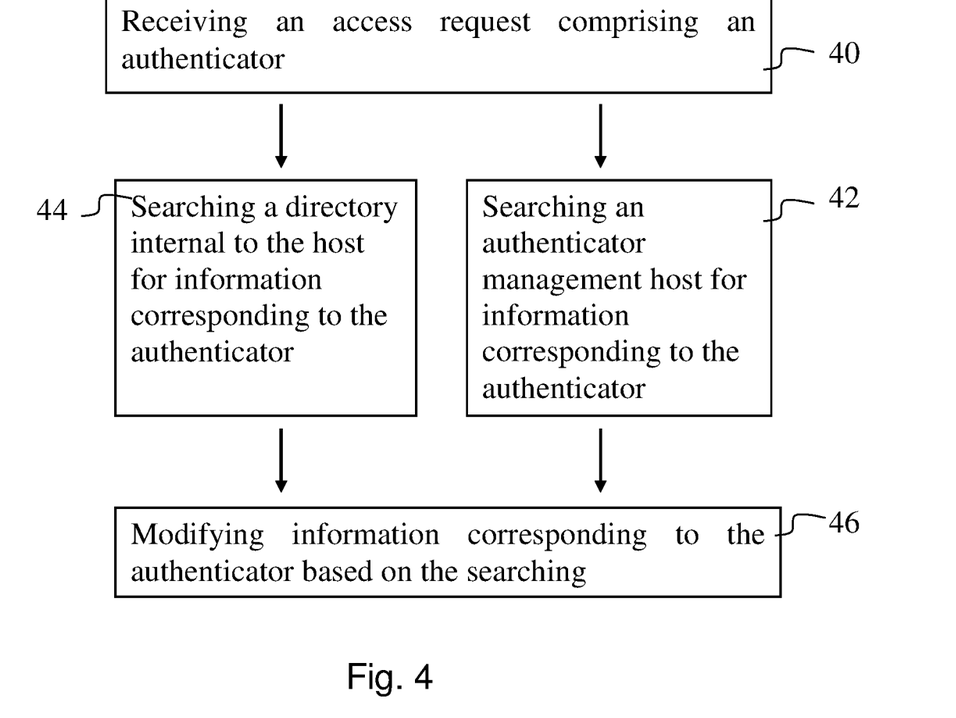

In accordance with an aspect a method of managing authenticator information in a computerized system comprises receiving an access request to a host comprising an authenticator. This is shown in blocks 20, 30 and 40 in FIGS. 2, 3 and 4, respectively. An algorithm running in the host or in an appropriate network entity can be arranged to cause searching in an authenticator management host for information corresponding to the authenticator and searching in a directory internal to the host for information corresponding to the authenticator. In FIG. 2 this is arranged such that the searching of the authenticator management host is performed first at 22, followed by searching at 24 at the host. In FIG. 3 the order is different, i.e., the internal directory of the host is searched first at 32, followed by searching of the authenticator management host. FIG. 4 shows a further possibility where the searching in the authenticator management host and in the host is done substantially in parallel at blocks 42, 44.

The search results can be used as basis of modification of information corresponding to the authenticator at blocks 26, 36 and 46. Examples of possible actions taken include modifying information corresponding to the authenticator in the directory internal to the host based on information received from the authentication management host. The modifying may comprise deleting information corresponding to the authenticator in the directory internal to the host. The modifying may also comprise synchronizing information corresponding to the authenticator between the directory internal to the host and the authentication management host. According to an aspect the modifying comprises moving information corresponding to the authenticator from the directory internal to the host to the authentication management host.

Checking of the internal directory of the host and the authenticator management host for information corresponding to the authenticator can also be used to reveal any "old" unaccounted for authenticators that may remain in hosts. When such an authenticator is found, an appropriate action such as deletion or moving thereof from the host can be performed. The system can be arranged to "clean" itself from old authenticators during operation without any operator input or participation.

In accordance with a possibility searching of the host in block 44 of FIG. 2 is triggered by determination that the information is not available at the authenticator management host at 42.

Figure 5:
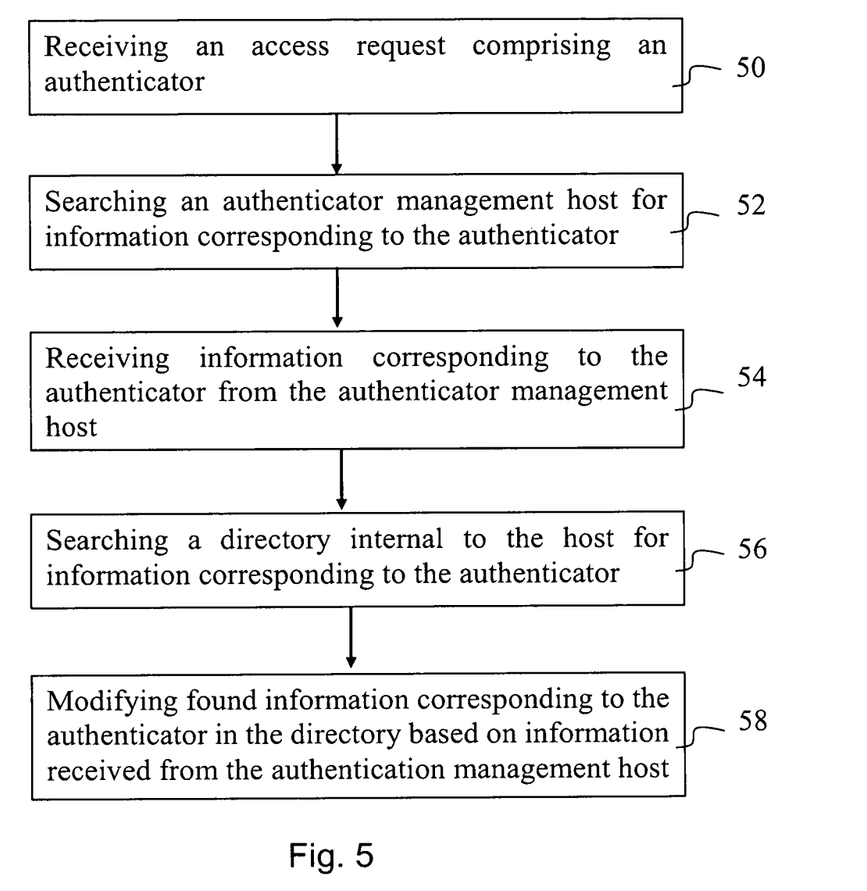

FIG. 5 shows a more detailed example of a method of managing authenticator information in a computerized system. In this example a host receives at 50 an access request comprising an authenticator. The host then searches at 52 from an authenticator management host for information corresponding to the authenticator. Information corresponding to the authenticator is received at 54 from the authenticator management host. The host can also search a directory internal to the host for information corresponding to the authenticator at 56. As above, the order of the searching can vary from that shown in FIG. 5, and be like in FIG. 3 or 4.

At stage 58 information is modified, in response to the host finding information corresponding to the authenticator from the directory internal to the host, based on information received from the authentication management host.

The host can then cause at 58 modification of information corresponding to the authenticator. The information can be modified in the directory internal to the host and/or the authentication management host. The causing of modification can be based on information received from the authentication management host. According to an aspect the host sends information to the authentication management host in response to the searching, for example finding information corresponding to the authenticator from the directory internal to the host that differ from the information received from the authentication management host. The host can, e.g., inform the authenticator management host of its configuration.

The host can receive control instructions from the authentication management host in response to first sending information to the authentication management host.

Figure 6:
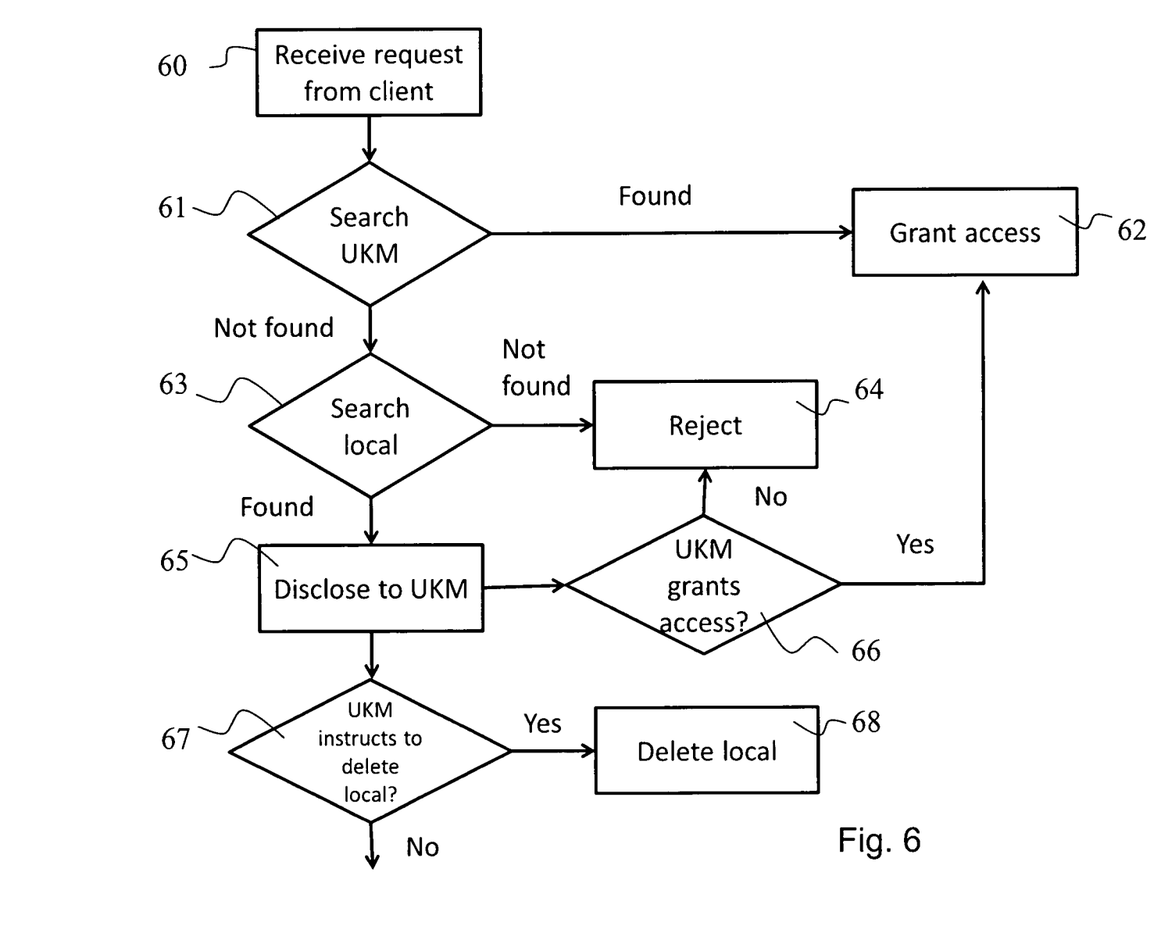
Figure 7:
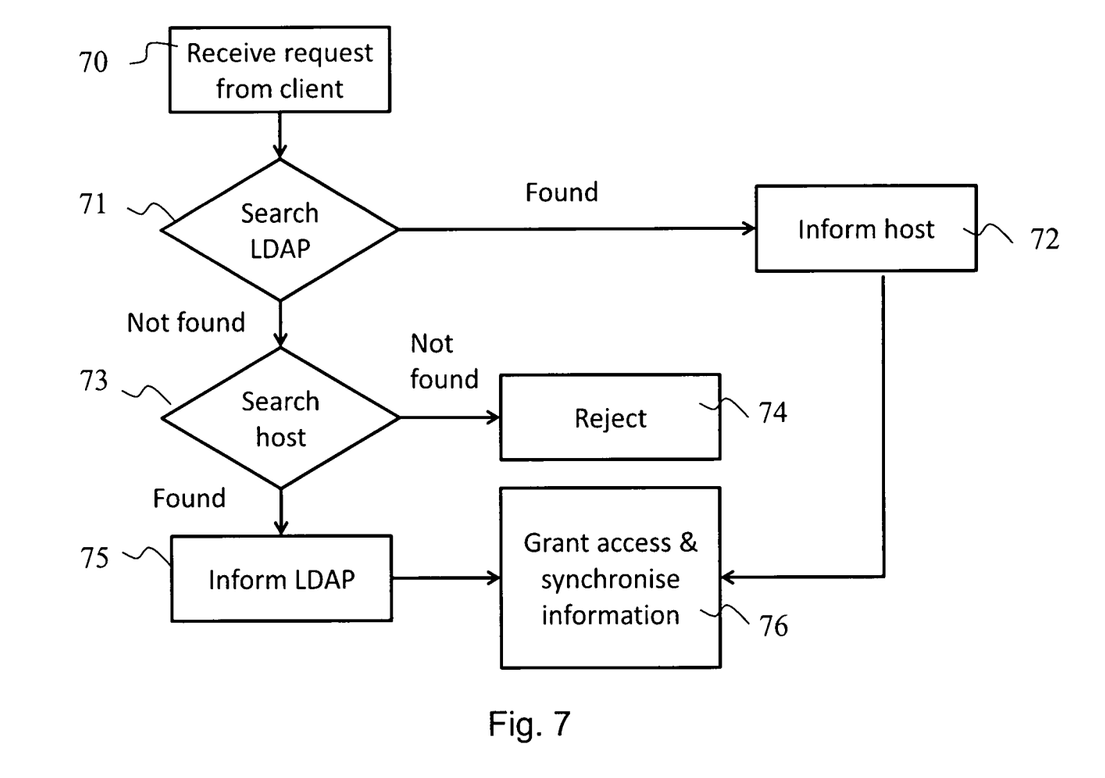

A possible action that can be taken in response to searching as described above relates to the granting or rejecting access requests. Examples for this are shown in FIGS. 6 and 7.

Granting access based on a request can be provided in response to finding information corresponding to the authenticator from at least one location.

According to a possibility granting or rejecting access to the host is based on control instructions received from the authentication management host. This is illustrated by FIG. 6 where an access request is received at 60 from a client. An authenticator management host, which is this example comprises a key manager labelled as UKM, is then searched at 61. If relevant information is found access is granted at 62.

If the information is not found from the authentication management host, a local directory of the host is searched at 63. If relevant information is still not found, the request is rejected at 64. If information is found, the authentication management host can be provided with information of the found information at 65. The authentication management host can then grant or reject the access request at 66.

The authentication management host can issue also other instructions for the host. FIG. 6 shows the possibility of the management hosts selectively instructing at 67 deletion of a found local configuration. The deletion option is shown by block 68. Other actions are also possible, e.g., synchronization or moving of the configuration information to a central location.

FIG. 7 shows an embodiment where an access request is received at 70 from a client. An authenticator management host, which is this example comprises a node according to LDAP, is then searched at 71. If relevant information is found, access is granted and host informed thereof at 72. If searched information is not found from the authentication management host, a local directory of the host is searched at 73. If information is still not found, the request can be rejected at 74. In case locally stored information is found, the authentication management host is provided with information of the found information at 75.

The authentication management host can then selectively grant access at 76. If access is granted, information is synchronized between the authentication management host and the local host at 76.

In the FIG. 1 example the method can be performed in the host 15. According to a possible network system 80 shown in FIG. 8 the method can be performed by a node 81 located between a client entity 2 sending a request for access and a host 15. An authenticator management apparatus 10 can be connected by link 84 to the intermediate data capturing apparatus 81 arranged for intercepting traffic in the network. The node 81 may also be configured to handle task e.g. in relation to security and auditing functions.

Figure 8:
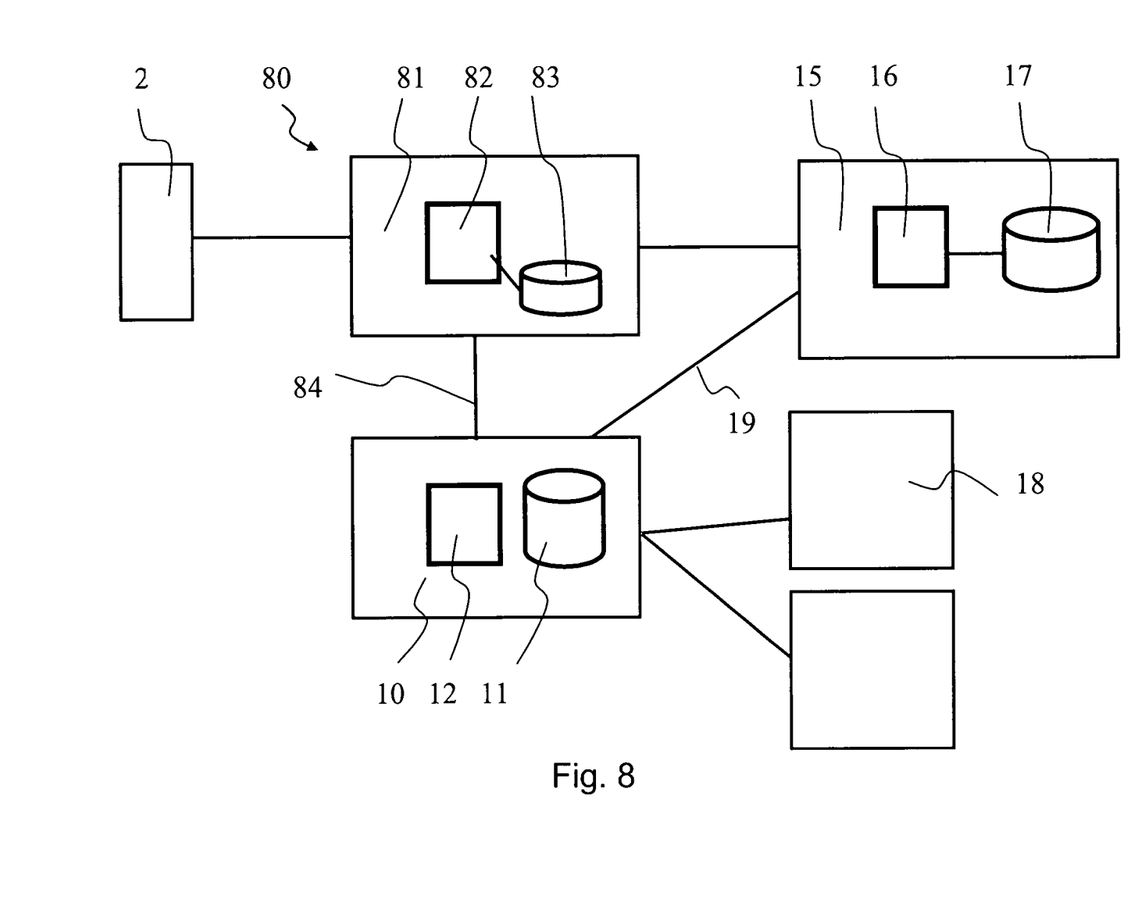
FIG. 8 shows another example of a system where the invention may be embodied.

The intermediate apparatus 81 comprising at least one processor and at least one memory 83 can be arranged to intercept and/or decrypt encrypted communications between users and hosts. More particularly, data between the entities may flow through an intermediate data processing device that hosts a data capturing entity configured to monitor traffic going there through and capture and forward data to another entity.

At least a part of data flowing through the intermediate entity may be encrypted. In such case the intermediate data processing device can be configured to provide a man-in-the-middle (MITM) type operation on encrypted data flowing there through to obtain the plaintext of the data. The MITM operation involves decryption of encrypted data. This would typically be based on knowledge of the private key used in the encryption. This information may be provided by node 10. The data capturing intermediate device can be operated and maintained by a trusted patty, typically the owner of the network, and can thus be provided with the necessary keys and/or other security information required for the decryption. It is noted that this is only an example and that the shown architecture and/or MITM type operation is not necessary in all scenarios.

According to a possibility an intermediate device can be configured to provide a security function between hosts and user devices capable of accessing the hosts. In this particular scenario a user accesses a host. The intermediate device can be configured to process requests for access to a host. After receipt of the request, the processor can obtain an authenticator or another security credential from another entity for use in the requested access. This may be provided by sending a request to an external security device and receiving an authenticator therefrom. Alternatively, the intermediate device may be provided with an integrated security device, and an authenticator may be requested therefrom. The intermediate device may further be configured to monitor communications that use the obtained authenticator. The intermediate device may also be configured to control communications that have been established based on authenticators from the security device. The authenticator may comprise a certificate, the control apparatus being configured to request for the certificate from a security device providing a certificate authority (CA). The CA may be an external entity or integrated with the intermediate apparatus. Other types of separate security devices, e.g. an authorization server, are also possible.

The intermediate apparatus can be arranged to use a first type of authenticator for access to the first type of hosts and a second type of authenticators for access to the second type of hosts. The intermediate apparatus may selectively request for an authenticator from a security device depending on the determined type of the host. In this case the determination of the type is performed before requesting for an authenticator. Alternatively, the intermediate apparatus may send the host an authenticator basket comprising different types of authenticators. The host can then select one or more authenticators it is adapted to use.

A possibility is that the intermediate has obtained authenticators for the different types of hosts, and determines whether to use an authenticator it has already received from a security device depending on the determined type of the host. The first type of hosts may comprise legacy hosts and the second type of hosts may comprise cloud hosts. The apparatus may be configured to determine whether the target host is a legacy host or a cloud host. The legacy target hosts do not necessarily support certificate based authentication, or the legacy hosts are not configured to use certificates. Instead, the legacy hosts may operate based on e.g. principal key pairs. For example, "authorized_keys" files of target accounts can have been populated with the public keys of the corresponding "Principal Keypairs". The population can be done e.g. in the host provisioning phase. A possibility is to perform the population dynamically using a key management system. The intermediate apparatus can be configured to determine whether the certificate or principal keys based access shall be used. According to an aspect the apparatus is configured to, in response to a request for access to a host, determine the type of the host, and request for a certificate in response to determining that the host is a cloud host, and to use the principal keypairs in response to determining that the host is a legacy host.

FIG. 8 shows also further hosts 18 connected to the authenticator manager 10 via links 19.

According to a possibility an authentication management host, such as the authentication management host 10 of FIGS. 1 and 8, can be configured to implement the herein disclosed method.

Any of the aspects and elements described herein may be omitted, reordered, or combined to form new embodiments. No ordering on steps of processes or elements of embodiments is implied unless necessary in a particular context (even describing what is done first in a drawing is not intended to impose an ordering constraint in alternative embodiments). Some steps may be implemented as a continuous ongoing process. Any process step may be implemented as computer executable instructions, software modules, digital logic, or computer hardware, or any combination thereof, as applicable. Computer-executable instructions for causing a computer to perform any of the methods may be stored on a non-transitive computer-readable medium (such as RAM, ROM, DVD, file server, web server).

Figure 9:
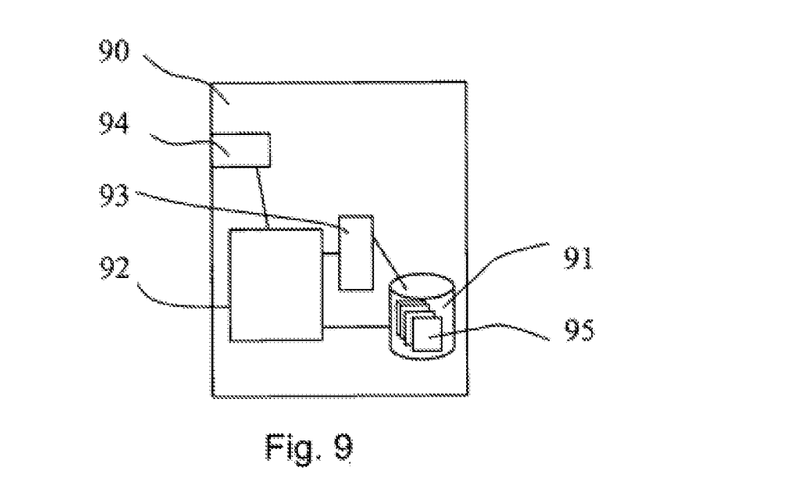
FIG. 9 shows a data processing apparatus suitable for implementing the examples.

FIG. 9 shows an example of control apparatus for a device capable of processing the above described actions of managing authenticator information. The control apparatus 90 can be for example integrated with, coupled to and/or otherwise controlling a host and/or an intermediate network apparatus. For this purpose the control apparatus comprises at least one memory 91, at least one data processing unit 92, 93 and an input/output interface 94. The database 91 is shown to comprise entries, or directory entities 95. Via the interface the control apparatus can be coupled to other elements of a network. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various aspects, examples and features of various examples discussed above can be combined in manners not specifically shown by the drawings and/or described above.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

We claim:

1. A method of managing authenticator information in a computerized system, the method comprising:
   receiving an access request to a host, the access request comprising an authenticator for enabling access to the host,
   causing, in response to the received access request, searching in an authenticator management host for information corresponding to the authenticator based on the received access request and searching in a directory internal to the host for information corresponding to the authenticator based on the received access request, and
   causing moving of information corresponding to the authenticator from the directory internal to the host to the authenticator management host based on the searching in the authenticator management host and the directory internal to the host.

2. The method according to claim 1, comprising granting access to the host in response to finding information corresponding to the authenticator.

3. The method according to claim 1, comprising sending, in response to information corresponding to the authenticator being found from the directory internal to the host, information from the host to the authenticator management host.

4. The method according to claim 3, comprising receiving control instructions from the authenticator management host in response to said sending of information from the host to the authenticator management host.

5. The method according to claim 4, comprising granting or rejecting access to the host based on the control instructions received from the authenticator management host.

6. The method according to claim 4, comprising modifying information corresponding to the authenticator in the directory internal to the host based on information received from the authenticator management host.

7. The method according to claim 1, the moving comprising deleting information corresponding to the authenticator in the directory internal to the host.

8. The method according to claim 1, the moving comprising synchronizing the information corresponding to the authenticator between the directory internal to the host and the authenticator management host.

9. The method according to claim 1, wherein the step of causing searching in the authenticator management host is performed before searching the directory internal to the host.

10. The method according to claim 1, wherein the step of causing searching in the directory internal to the host is performed before searching the authenticator management host.

11. The method according to claim 1, wherein the step of causing searching in the authenticator management host is performed in parallel to searching the directory internal to the host.

12. The method according to claim 1, comprising performing the method in the host.

13. The method according to claim 1, comprising performing the method in an interim node between the host and a client sending the access request to the host and/or in the authenticator management host.

14. The method according to claim 1, comprising:
   searching by the host from an authenticator management host for information corresponding to the authenticator,
   receiving by the host information corresponding to the authenticator from the authenticator management host,
   searching by the host a directory internal to the host for information corresponding to the authenticator, and
   causing modification of information corresponding to the authenticator in the directory internal to the host and/or the authenticator management host based on information received from the authenticator management host.

15. The method according to claim 14, comprising receiving modification instructions from the authentication management host directing modification of information corresponding to the authenticator in the directory internal to the host.

16. The method according to claim 14, the modifying comprising one of:
   deleting information corresponding to the authenticator from the directory internal to the host, or
   synchronizing the information corresponding to the authenticator between the directory internal to the host and the authenticator management host.

17. An apparatus for managing authenticator information in a computerized system, the apparatus comprising at least one one processor and at least one memory comprising program code for causing, with the at least one processor, the apparatus to:
   process a received access request to a host, the access request comprising an authenticator for enabling access to the host,
   cause, in response to the received access request, searching in an authenticator management host for information corresponding to the authenticator based on the received access request and searching in a directory internal to the host for information corresponding to the authenticator based on the received access request, and
   cause moving of information corresponding to the authenticator from the directory internal to the host to the authenticator management host based on the searching in the authenticator management host and the directory internal to the host.

18. The apparatus of claim 17, where the apparatus comprises the host, the host being configured to search from the authenticator management host for information corresponding to the authenticator, receive information corresponding to the authenticator from the authenticator management host, search the directory internal to the host for information corresponding to the authenticator, and cause the moving of information corresponding to the authenticator from the directory internal to the host to the authenticator management host.

19. The apparatus according to claim 18, further configured to send, in response to finding information corresponding to the authenticator from the directory internal to the host, information from the host to the authenticator management host.

20. The apparatus of claim 17, wherein the apparatus comprises the authenticator management host or an intermediate network device located in a communications path between a sender of the access request and the host.

21. The apparatus according to claim 17, wherein the authenticator management host comprises a key manager or a Lightweight Directory Access Protocol (LDAP) server.

22. The apparatus according to claim 17, configured to cause grant of the requested access in response to information corresponding to the authenticator being found.

23. The apparatus according to claim 17, configured to cause modification of information corresponding to the authenticator in the directory internal to the host based on the searching.

24. The apparatus according to claim 17, the moving comprising at least one of deletion of information corresponding to the authenticator in the directory internal to the host or synchronization of the information corresponding to the authenticator between the directory internal to the host and the authenticator management host.

25. A non-transitory computer readable media comprising program code for causing a processor to perform instructions for authenticator management operations in a computerized network, wherein the instructions perform a method comprising:

analyzing a received access request to a host, the access request comprising an authenticator for enabling access to the host, causing, in response to the received access request, searching in an authenticator management host for information corresponding to the authenticator based on the received access request and searching in a directory internal to the host for information corresponding to the authenticator based on the received access request, and causing moving of information corresponding to the authenticator from the directory internal to the host to the authenticator management host based on the searching in the authenticator management host and the directory internal to the host.

* * * * *

UNITED STATES PATENT AND TRADEMARK OFFICE
CERTIFICATE OF CORRECTION

PATENT NO. : 10,574,634 B2
APPLICATION NO. : 15/429526
DATED : February 25, 2020
INVENTOR(S) : Tero Mononen et al.

Page 1 of 1

It is certified that error appears in the above-identified patent and that said Letters Patent is hereby corrected as shown below:

In the Claims

On Column 10, Claim 17, Line 41:
Delete "one one" and insert --one-- therefor

Signed and Sealed this
Seventh Day of July, 2020

Andrei Iancu
*Director of the United States Patent and Trademark Office*